United States Patent [19]

McCall

[11] 3,927,760
[45] Dec. 23, 1975

[54] CONVEYOR HANGER MODULAR CONSTRUCTION

[75] Inventor: John W. McCall, Birmingham, Mich.

[73] Assignee: Formall, Inc., Warren, Mich.

[22] Filed: Sept. 23, 1974

[21] Appl. No.: 508,260

[52] U.S. Cl............. 198/177 T; 403/364; 105/156; 105/154
[51] Int. Cl.²...................................... B65G 17/20
[58] Field of Search....... 198/177 R, 177 T; 104/89, 104/95, 172 S; 105/156, 148, 154; 211/177; 248/159, 220.5; 403/364, 326, 2, 11

[56] References Cited
UNITED STATES PATENTS
2,212,695  8/1940  Nash .................................. 105/156
3,814,023  6/1974  Stantial ............................. 105/154

*Primary Examiner*—James B. Marbert

[57] ABSTRACT

A conveyor trolley hanger of modular construction comprising a proximal hanger member and one or more modular hanger members each removably attachable thereto and to each other by a universal coupling. The hanger members are made of a suitable plastic material, superficially colored or colored throughout to meet government occupational and safety requirements and specifications. The hanger members can be provided with laterally extending arms or members supported upon and by them. Such parts-supporting arms are removably attachable to the hanger members. The arms extend laterally from sleeves secured to and upon the hanger members, transversely thereof and disposed in a fixed or a rotatable posture depending upon the construction of the hanger members.

21 Claims, 6 Drawing Figures

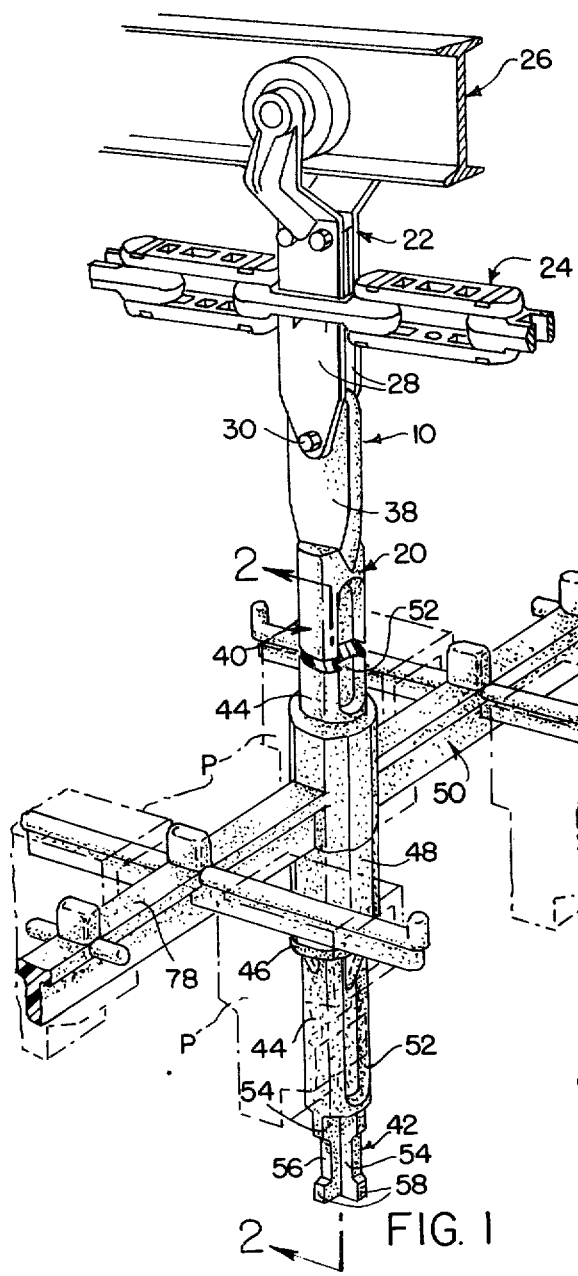
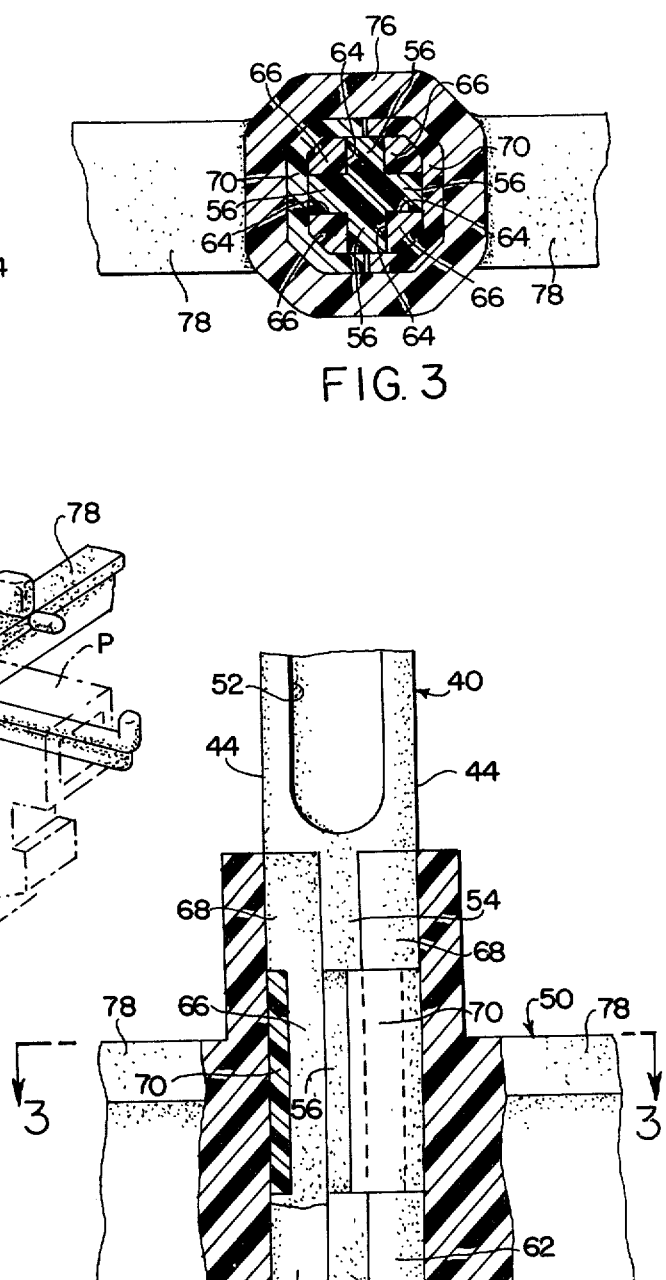
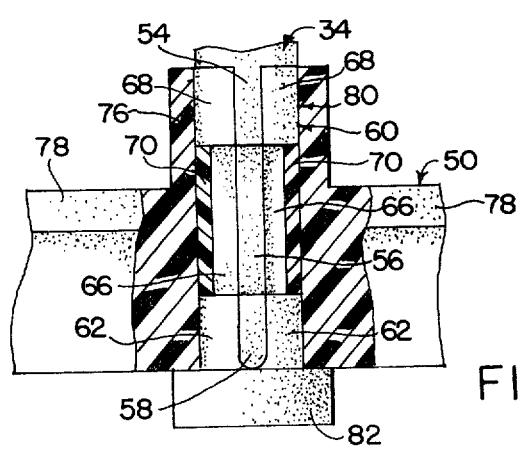
FIG. 1
FIG. 2
FIG. 3
FIG. 6

CONVEYOR HANGER MODULAR CONSTRUCTION

BACKGROUND OF THE INVENTION

Heretofore, conveyor trolley hangers for industrial applications have almost universally been made of steel bars or rods with laterally extending arms of steel to support parts or devices carried by the conveyor system. These hangers have generally had the conventional steel grey-blue coloration, oftentimes relatively difficult to perceive and distinguish in industrial sites, particularly where machining operations generate considerable mist, smoke and other environmental atmospheric fumes. The presence of moving conveyor hangers, usually loaded with heavy parts, is not always sensed by personnel in these industrial and factory locations, so that injuries to persons and damage to parts often occur. The fact of such injuries has been recognized in the enactment of the federal government's Occupational, Safety and Health Act (OSHA), under which a number of safety regulations and specifications have been drawn requiring the coloration of moving hazards, such as conveyor hanger devices, with a yellow or orange color, to make them more readily visible to personnel in the areas through which the conveyor system operates.

Another limitation of currently used conveyor hangers is that their design is not readily adapted to modular construction. Parts-supporting members having arms extending laterally are supported from and affixed to a hanger rod, as a unitary structure. Modification is made with difficulty. These components of the steel hanger rod ar generally welded together, forming a very heavy and ponderous conveyor hanger, which upon loading with machine parts often attains weights of several hundred pounds. When such a mass and load, in swinging movement during conveyor operation, strikes a person or an object, injury or damage is expectedly generated and incurred.

SUMMARY OF THE INVENTION

The invention pertains to a conveyor trolley-supported hanger having a proximal hanger member pivotally supported upon the clevis of the conveyor trolley by a clevis pin and terminating at its distal end in a section adapted to couple with a complementary section of a modular hanger member removably connectable thereto.

The proximal hanger member is provided with a proximal pad portion attachable to the conveyor trolley clevis and at its distal end with a male coupling section or fitting attachable to and engageable with the female coupling section of a modular hanger member. Each modular hanger member is provided at one end with a female coupling section and at its opposite end with a complementary male coupling section. The female section is provided with cruciform slots, segmenting the section axially into four quadrants. Engagement of the hanger members is readily effected by insertion of the male coupling section of one hanger member within the slotted openings of the female coupling section of another hanger member, the mated sections being encircled by split closure members. The medial sleeve portion of a parts-carrying member, for translating parts or devices from one location to another by the conveyor system, is then passed over the mated sections and the split closure members, securing them together therewithin. These parts-carrying members are generally provided with laterally or radially extending arms connected to the medial sleeve portion. Each hanger member can provide the site of and support for a parts-carrying member. A spacer sleeve is disposed on the modular hanger member for locating the sleeve of the parts-carrying member in encircling posture about the conjoined male and female sections, preventing disengagement and separation of these sections.

The proximal hanger member and the conjoined modular hanger members are made of a selected plastic material having substantially high tensile strength, excellent wear characteristics, resistance to deformation at ambient temperatures in the range of from about 60° to about 150° F., highly resistant to corrosion of industrial atmospheres, and have excellent physical resistance to abuse and shock. These plastic materials can be used in solid form or can be foamed. They are readily moldable in die and plastic-fabricating equipment, can be easily colored superficially or throughout, to meet federal, state and/or local safety requirements and specifications.

The invention provides a design for fabricating the conveyor trolley hanger in component elements, including a proximal hanger member and a plurality of modular hanger members connectable thereto. A distal terminal hanger member of special configuration can be used.

It is an object of the invention to provide a conveyor trolley hanger device having a proximal hanger member terminating in a coupling fitting complementary to and engageable with a complementary fitting at one end of an associated modular hanger member. Another object is to provide complementary coupling sections in a hanger device permitting removable securement of modular hanger members with a proximal hanger member and with each other. Yet another object is to provide coupling means in a conveyor hanger for a plurality of parts-carrying members removably attachable thereto and therewith. A further object is the provision of hanger coupling sections permitting the hanger to be formed by a plurality of members. Still a further object is the fabrication of the components of such a hanger device of a plastic material having substantially high tensile strength, wear characteristics and resistance to deformation at ambient temperatures, and which can be colored either throughout or superficially to make their presence readily observable, particularly in industrial environments.

Various further and more specific objects, features and advantages of the invention will appear from the description given below, taken in connection with the accompanying drawings, illustrating by way of example a preferred form or forms of the invention. Reference is here made to the drawings annexed hereto and forming an integral part of this specification, in which FIG. 1 is a perspective view of the proximal hanger member of a conveyor trolley hanger device, in a preferred embodiment of the invention.

FIG. 2 is a vertical sectional view taken substantially on the line 2—2 of FIG. 1.

FIG. 3 is a horizontal sectional view, taken substantially on the line 3—3 of FIG. 2.

FIG. 6 is a front elevational view, partially in section, of an optional preferred form of a distal hanger member attachable to the modular or proximal hanger member illustrated in FIGS. 1 and 5.

DESCRIPTION OF A PREFERRED EMBODIMENT

Figure 4:
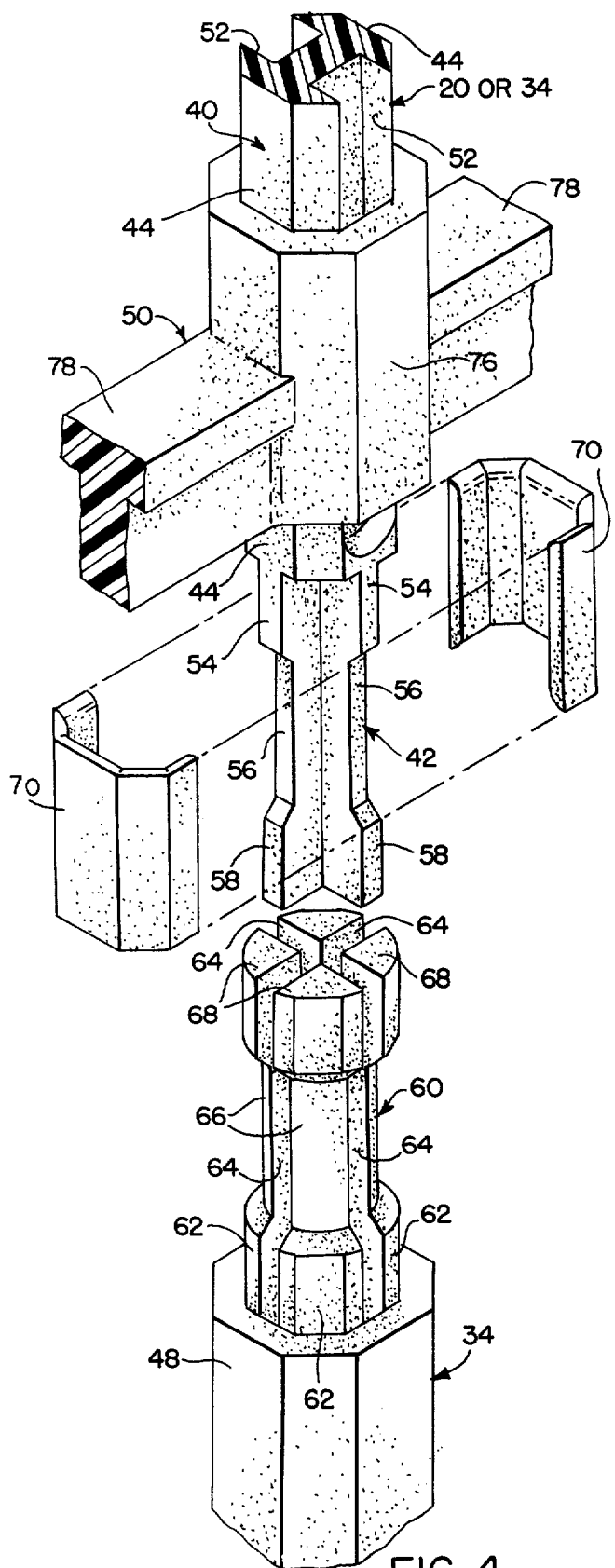
FIG. 4 is an exploded perspective vertical view of the coupling portion of the hanger members illustrated in FIG. 2.

As illustrated in the several views of the drawings, a preferred embodiment of the invention comprises the hanger 10 having a proximal hanger member 20 pivotally secured to the trolley 22 which is actuated by a connected conveyor drive chain linkage 24 for rolling movement upon the conveyor beam 26. The conveyor beam trolley 22 and drive chain 24 are of conventional construction and connection. The trolley 22 includes among other elements a pair of depending clevis members 28,28 and the clevis pin 30.

The hanger 10 embodies a proximal hanger member 20 and one or more modular hanger members 34. Optionally, the distal hanger member of a series forming the hanger 10 may be modified as illustrated in FIG. 6 and described hereinafter below.

The proximal hanger member 20 is provided at its proximal end with the clevis attachment pad portion 38 which has a bearing opening therethrough to receive the clevis pin 30 that secures the proximal hanger member 20 to the clevis members 28,28. Such attachment is of conventional construction. The proximal hanger member 20 further includes the hanger rod section 40 and the distal end male coupling section 42 of cruciform design. The intermediate hanger rod section 40 may be of any conventional cross-sectional configuration but, in some instances, it is preferred that there be some vertically extending planar surfaces upon which laterally extending parts-carrying members can be disposed to maintain them in non-rotating posture. As illustrated particularly in FIGS. 1 and 4, the hanger rod section 40 is provided with two spaced apart planar surfaces or sides 44,44. The proximal hanger member 20 is further provided with a flange or annular member 46, at least portions of which extend laterally or radially outwardly from the intermediate body portion 40, as a stop or rest for the spacer sleeve 48 slidingly disposed on the hanger rod portion 40. A parts-supporting and carrying member 50 is supported upon the intermediate hanger rod portion 40 of the proximal hanger member 20 and comes to rest against the upper end of the spacer sleeve 48. To reduce the mass and weight of material in the proximal hanger member 20, the intermediate hanger rod portion 40 is provided with longitudinally extending recesses 52,52. The distal cruciform male coupling section 42 comprises the ribs 54 arranged at 90° to each other, each having medial longitudinally extending indented portions 56 and distal end portions 58.

The modular hanger member 34 comprises substantially the same structure as that above described for the proximal hanger member 20 except that the proximal end pad portion 38 is replaced by a female coupling section 60 having quadrant members 62 arranged at 90° to and spaced apart from each other to provide the longitudinally slotted openings 64 therebetween. The quadrant members 62 have intermediate longitudinally extending indented portions 66 and distal end portions 68.

The remainder of the modular hanger member 34 is substantially identical to similar portions and sections of the proximal hanger member 20. The modular hanger member 34 is provided with the intermediate hanger rod portion 40, a spacer sleeve member 48, the stop flange 46, the planar surfaces 44 and the distal male coupling section 42.

As shown particularly in FIGS. 2 and 3, assembly of the distal male coupling section 42 with the proximal female coupling section 60 is effected by inserting the ribs 54 and their distal end portions 58 into the slots 64 defined by and spaced between the quadrant members 62 and their distal sections 68 until the intermediate indented rib portions 56 are aligned with the indented quadrant portions 66 of the female coupling section 60. Securing the male and female sections 42 and 60 together in their mating relationship are a pair of split closure members 70,70 having inner surfaces substantially complementary to the outer exposed surfaces of the indented sections 56 and 66 with which they come into substantially close contact, and outer surfaces which lie in substantially the same planes as do the outer surfaces of the sections 42 and 60 at their rib portions 54 and 58 and quadrant sections 62 and 68, respectively. The split closure members 70,70 provide a substantially continuous outer surface for the connected hanger rod portions at their mated sections, and prevent axial disengagement of these sections.

A parts-carrying member 50 is provided with a medial sleeve 76 having an inner bore designed to closely complement the outer exterior surfaces of the split closure members 70,70 which it overlies and secures therewithin upon the mated coupling sections. Extending radially from the medial sleeve 76 are parts supporting arms 78,78 of any conventional configuration designed for parts translation by the conveyor system. A representative example of such laterally extending arms 78 is illustrated in FIG. 1. These parts-carrying arms may be of any new or conventional prior art configuration.

To secure and support the parts-carrying member 50 on the proximal hanger member 20, the medial sleeve 76 of a parts-carrying member 50 is slipped over the pad portion 38 and the rod portion 40 of the proximal hanger member until it seats against the spacer sleeve 48 at rest upon the stop flange 46. Before a modular hanger member 34 is secured to the proximal hanger member 20, a parts-carrying member 50 is slipped onto the rod portion 40 above the male coupling section 42 of the proximal hanger member 20 and then brought down to and against the spacer sleeve 48 of the hanger member 34 after the male and female coupling sections 42 and 60 have mated and the split closure members 70,70 encircled about their indented portions. This posture is illustrated in FIG. 2.

As shown particularly in FIG. 6, the distal hanger member 80 of the hanger 10 comprises a simple female coupling section 60, engageable with the distal male coupling section 42 of the hanger member 20 or 34 thereabove, and the terminating distal flange 82. The distal hanger member 80 may be used to terminate the hanger 10 at its lowermost distal end and shorten the overall length of the hanger when such is required or desired. The distal flange 82 operates as a stop for the sleeve 76 of the parts-carrying member 50 supported thereon.

In some instances it may be desirable to have the parts-carrying member 50 arranged for rotation on the hanger members 20 or 34. In such event, the outer surfaces of the male coupling rib portions 54 and 58, the outer surfaces of the female coupling quadrant portions 62 and 68, and the outer surfaces of the split closure members 70,70 are preferably of a circular arcuate configuration, so that the medial sleeve portion 76 of the member 50 can rotate thereabout. Such rotation is often desirable or required in conveyor systems where shop personnel are on one side only of the conveyor system, and it is therefore safer to rotate the parts-carrying arms 78,78 about the hanger members so that an unloaded arm or portion thereof is presented more closely to the machine operator.

In a preferred form of the hanger 10, the proximal hanger member 20, the modular hanger members 34 and the terminal distal hanger member 80 are each formed as integral components except for the spacer sleeve 48, although under certain conditions the sleeve could also be embodied integrally with the other features of the hanger members.

If will of course be understood that the spacer sleeve 48 may be dispensed with by positioning the stop flange 46 at the required or desired position axially of the hanger members 20 and 34, for any particular conveyor system. A benefit derived from fabricating the spacer sleeve 48 separately for incorporation in the hanger combination with the rod portions 40 of hanger members 20 and/or 34 lies in the fact that it can be made of any length required to suit the axial length of the parts-carrying member sleeve 76 which varies in accordance with the dimensional requirements of the parts to be carried and the conveyor system in which the hanger 10 will form a component element.

The component parts of the hanger 10 are preferably molded of a suitable plastic material which can be selected from a group including fiberglass-reinforced nylon, polypropylene, high density polyethylene, acrylonitrile-butadienestyrene (ABS), polystyrene, and other similar or equivalent plastic materials, free of or reinforced with fiberglass filaments. Desirable physical properties of the selected plastic material include substantially high load-bearing characteristics, substantially high tensile strength, substantially high resistance to deformation at ambient temperatures of from about 60° to 150° F., corrosive atmospheres, chemical solutions, and physical abrasion. In special applications, specifically formulated plastic compositions can be provided to withstand up to about 500° F. Most of the above-identified plastic materials can be foamed and the foamed plastic fabricated by molding into the component elements hereindisclosed, having the advantage of being substantially lower in weight than the solid materials, and this further improving their safety and utility in a conveyor system. Additionally, coloring of the hangers provides means for identification of the parts being conveyed and of the stages of machine processing of such parts.

To place the hanger of this invention in operative service, a first parts-carrying member 50 is passed over the proximal pad portion 38 of the hanger member 20 and downwardly upon the intermediate rod portion 40 until it comes to rest against the spacer sleeve 48, as shown particularly in FIG. 1. The next lower parts-carrying member 50 is disposed with its sleeve portion 76 about the rod portion 40 and upwardly above the male cruciform coupling section 42, as in FIG. 4. The modular hanger member 34 is then presented with its female coupling section 60 to the male coupling section 42, as in FIG. 4, and the two sections are mated together so that the intermediate indented rib portions 56 of the male coupling section and the indented portions 66 of the female coupling section are aligned. The split closure members 70,70 are then brought together about the indented section, and the parts-carrying member 50 immediately thereabove is brought downwardly from the rod portion 40 upon the encircled mated sections until it comes to rest against the sleeve member 48 or the stop slange 46, if no sleeve member is used, immediately therebelow.

Each parts-carrying member 50 and modular hanger member 34 to be added to the hanger 10 is then assembled to the modular hanger member next immediately thereabove in the same manner. Should it be necessary or desirable to terminate the hanger with the distal hanger member 80, the female coupling section 60 thereof is mated with the male coupling section 42 of the hanger member immediately thereabove, the split closure members 70,70 enclosing their indented portions, and the lowermost parts-carrying member 50 is then lowered onto the encircled mated coupling sections until its sleeve 76 abuts the upper surface of the distal flange 82.

After hanger 10 has been completely assembled as described above, the proximal pad portion 38 is inserted between the clevis members 28,28 and the clevis pin 30 passed through these members and the clevis opening provided in the pad portion 38, securing the hanger 10 to the trolley 22. Alternatively, the proximal hanger member 20 can be first secured to the trolley clevis and the modular hanger members 34 added to the member 20 thereafter.

Figure 5:
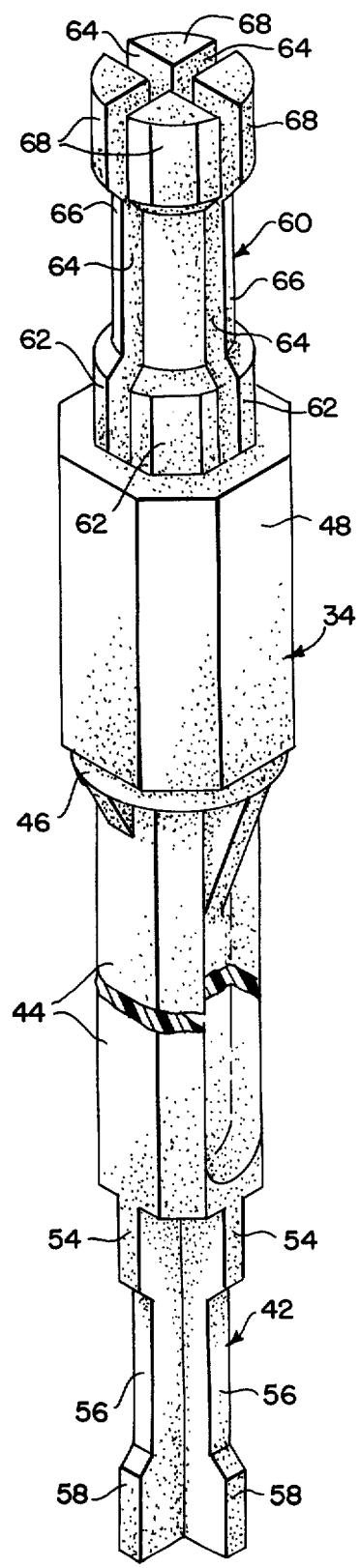
FIG. 5 is a perspective view of a unit modular hanger member.

It will of course be understood by persons skilled in the art to which the invention pertains that the proximal hanger member 20 can terminate at its distal end in a female coupling section 60 instead of the male coupling section 42. In such event the modular hanger member 34 (FIG. 5) is inverted for male section coupling connection to the female section of the proximal hanger member 20 and of each modular hanger member 34 in the hanger series. Similarly, the terminal distal hanger member 80 can be provided with a male coupling section 42 in place of the above described female coupling section 60, to accommodate such inverted hanger series.

Although certain particular embodiments of the invention have been disclosed herein for purposes of explanation, further modifications or variations thereof, after study of this specification, will or may become apparent to those skilled in the art to which the invention pertains. Reference should therefore be had to the appended claims in determining the scope of the invention.

I claim:

1. A parts-carrying hanger of modular construction for removable attachment to the clevis of a trolley in a trolley conveyor system, said hanger comprising
   a proximal hanger member having
     a proximal end portion adapted to be secured to said trolley clevis by a clevis pin,
     an intermediate rod portion,
     and a distal end terminating in a first coupling section,
   one or more modular hanger members each having
     a proximal end terminating in a complementary second coupling section,
     an intermediate rod portion,
     and a distal end terminating in a first coupling section,
   each modular hanger member being connected to the next preceding hanger member by their complementary coupling sections and by closure means encircling at least portions of said mated coupling sections, and one or more parts-carrying members each having means for attachment to and disposed upon and about each said mated coupling sections, and one or more parts-supporting arms connected to and extending outwardly from said attachment means.

2. The hanger defined in claim 1, wherein
said proximal hanger member proximal end portion comprises a pad portion having a bearing openinng transversely therethrough for said clevis pin.

3. The hanger defined in claim 1, wherein
said first coupling section comprises a male coupling section.

4. The hanger defined in claim 3, wherein
said male coupling section is of cruciform crosssectional design having longitudinally extending rib members arranged at substantially 90° to each other, said rib members having longitudinally extending intermediate indented portions.

5. The hanger defined in claim 4, wherein
said second coupling section comprises a female coupling section.

6. The hanger defined in claim 5, wherein
said female coupling section is of cruciform crosssectional design having longitudinally extending quadrant members spaced apart from each other by longitudinally extending slots therebetween arranged at substantially 90° to each other,
said quadrant members having longitudinally extending intermediate indented portions.

7. The hanger defined in claim 6, wherein
said closure means comprises split closure members closely encircling said rib member and quadrant member intermediate indented portions, to prevent axial displacement of said mated coupling sections.

8. The hanger defined in claim 1, wherein
said parts-carrying member attachment means comprises a substantially medial sleeve disposed upon and about each said mated closure means encircled coupling sections.

9. The hanger defined in claim 7, wherein
said parts-carrying member attachment means comprises a substantially medial sleeve disposed upon and about each said mated closure means encircled coupling sections.

10. The hanger defined in claim 1, wherein
said proximal hanger member rod portion is provided with a transversely projecting flange member to limit the axial travel of a said parts-carrying member thereon.

11. The hanger defined in claim 1, wherein
said modular hanger member rod portion is provided with a transversely projecting flange member to limit the axial travel of a said parts-carrying member disposed upon and about said mated coupling sections at its proximal end.

12. The hanger defined in claim 10, wherein
said proximal hanger member rod portion is further provided with a spacer sleeve disposed thereon between said parts-carrying member and said flange member.

13. The hanger defined in claim 11, wherein
said modular hanger member rod portion is further provided with a spacer sleeve disposed thereon between said parts-carrying member and said flange member.

14. The hanger defined in claim 7, wherein
the outer surfaces of said split closure members lie substantially in the same planes as the outer surfaces of said coupling sections rib members and quadrant members longitudinally next adjacent thereto, to provide substantially continuous surface planes therewith.

15. The hanger defined in Claim 1, wherein
said hanger terminates in a distal hanger member comprising
a second coupling section and a distal flange member adjacent thereto and extending outwardly therefrom, as a stop for said parts-carrying member.

16. The hanger defined in claim 1, wherein
said hanger terminates in a distal hanger member comprising
a first coupling section and a distal flange member adjacent thereto and extending outwardly therefrom, as a stop for said parts-carrying member.

17. The hanger defined in claim 1, wherein
said proximal hanger member, said one or more modular hanger members and said one or more parts-carrying members are formed of a molded plastic material having a substantially high impact resistance character.

18. The hanger defined in claim 17, wherein
said plastic material is further characterized by having substantially high tensile strength and high load-bearing qualities.

19. The hanger defined in claim 17, wherein
said plastic material is further characterized by having substantially high resistance to deformation at ambient temperatures, corrosive atmospheres, chemical solutions and physical abrasion.

20. The hanger defined in claim 17, wherein
said plastic material is further characterized by being foamed and reinforced with fiberglass filaments.

21. The hanger defined in claim 17, wherein
said plastic material is further characterized by being reinforced with fiberglass filaments.

* * * * *